United States Patent
Palmer et al.

(10) Patent No.: US 11,144,676 B1
(45) Date of Patent: Oct. 12, 2021

(54) SECURITY OBJECT MANAGEMENT SYSTEM

(71) Applicant: UIPCO, LLC, San Antonio, TX (US)

(72) Inventors: Martin Christopher Palmer, Helotes, TX (US); Paul Joseph Oncale, III, Cibolo, TX (US); Tammy Sue O'Neal, San Antonio, TX (US); Maria Carmelite Langley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 252 days.

(21) Appl. No.: 16/288,518

(22) Filed: Feb. 28, 2019

(51) Int. Cl.
*G06F 13/00* (2006.01)
*G06F 21/62* (2013.01)

(52) U.S. Cl.
CPC .................. *G06F 21/629* (2013.01)

(58) Field of Classification Search
CPC ............ G06F 16/2365; G06F 16/9535; G06F 16/955; G06F 21/10; G06F 21/629; G06F 21/64; G06F 2221/2141

USPC ................................................. 726/4, 15, 21
See application file for complete search history.

(56) References Cited

U.S. PATENT DOCUMENTS 8,572,724 B2 *  10/2013  Radhakrishnan .. G06Q 20/4016
                                                        726/15
8,931,057 B2 *   1/2015  Cicchitto ............ G06F 21/6218
                                                        726/4

\* cited by examiner

*Primary Examiner* — Hoan H Tran
(74) *Attorney, Agent, or Firm* — Plumsea Law Group, LLC (57) ABSTRACT

A security object management system may include a management module including a device processor and a non-transitory computer readable medium including instructions stored thereon, and executable by the processor, for performing the following steps: accessing a database having stored therein data regarding a plurality of security objects, wherein the data includes ownership data regarding the assignment of rights associated with the security objects; and receiving user input to change the reassignment of rights of at least one of the security objects from one user to another user of the system.

16 Claims, 8 Drawing Sheets

SECURITY OBJECT MANAGEMENT SYSTEM

TECHNICAL FIELD

The present disclosure generally relates to computer security and, more particularly, a security object management system.

BACKGROUND

Computer systems that permit access to multiple users often have different levels of user access for different users. Similarly, systems that have different applications, databases, modules, etc. also permit different users access to different components of the system. In order to regulate the access and authorization of multiple users, systems utilize security objects that include data regarding the security access of each user. In some cases, security objects may involve user interaction with the system, such as user logins (e.g., usernames and passwords). In other cases, security objects may function in the background in an automatic fashion. For example, once a user logs into the system, data associated with a security object may be tied to the user's profile, such that it permits the user access to certain components of the system.

Management of security objects is cumbersome, onerous, and inconsistent, especially for systems with a large number of users. Changes of assignment/ownership of security objects from user to user require significant amounts of time, effort, and organization. For large organizations and/or organizations with complex computing systems, when a user leaves the organization or even changes their role within the company, there can be numerous security objects owned by that user that need to be reassigned to another user.

There is a need in the art for a system that addresses one or more of the shortcomings discussed above. In particular, there is a need in the art for a security object management system.

SUMMARY

In one aspect, the present disclosure is directed to a security object management system. The system may include a management module including a device processor and a non-transitory computer readable medium including instructions stored thereon, and executable by the processor, for performing the following steps: accessing a database having stored therein data regarding a plurality of security objects, wherein the data includes ownership data regarding the assignment of rights associated with the security objects; and receiving user input to change the reassignment of rights of at least one of the security objects from one user to another user of the system.

In another aspect, the present disclosure is directed to a security object management system. The system may include a management module including a device processor and a non-transitory computer readable medium including instructions stored thereon, and executable by the processor, for performing the following steps: accessing a database having stored therein data regarding a plurality of security objects, wherein the data includes ownership data regarding the assignment of rights associated with the security objects; and receiving user input to certify the accuracy of data associated with at least one of the security objects.

In another aspect, the present disclosure is directed to a security object management system. The system may include a management module including a device processor and a non-transitory computer readable medium including instructions stored thereon, and executable by the processor, for performing the following steps: accessing a database having stored therein data regarding a plurality of security objects; receiving data from a different system; and automatically inputting, into the database, data associated with at least one security object.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The present disclosure is directed to a security object management system. Security objects may include data regarding the security access and authorization for users to utilize any of a variety of computerized systems. In some cases, the security objects may involve user interaction with the system, such as user logins (e.g., usernames and passwords). Additionally or alternatively, the security objects may function in the background in an automatic fashion. For example, once a user logs into the system, data associated with a security object may be tied to the user's profile, such that it permits the user access to certain components of the system, such as different applications, databases, modules, etc. The disclosed system is configured to facilitate the management of security objects by enabling the review, certification, editing, transfer, etc. of security objects.

Figure 1:
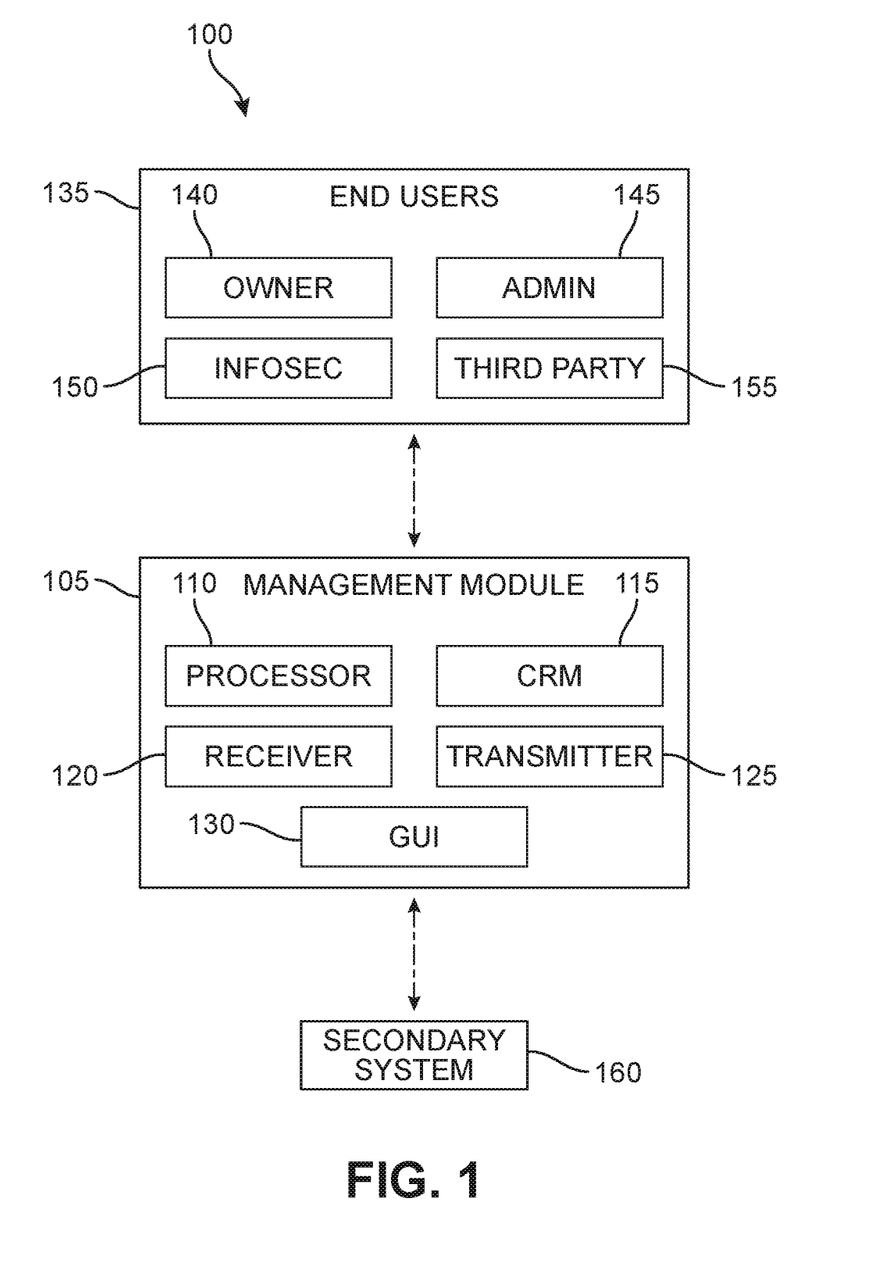
FIG. 1 is a schematic block diagram illustration of a management module of a security object management system.

FIG. 1 is a schematic block diagram illustration of a security object management system. In particular, FIG. 1 shows a management system 100, which may include a management module 105. Module 105 may include various computing and communications hardware, such as servers, integrated circuits, displays, etc. For example, as shown in FIG. 1, module 105 may include a device processor 110 and a non-transitory computer readable medium 115 including instructions executable by device processor 110 to perform the processes discussed herein.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Module 105 may include networking hardware configured to interface with other nodes of a network, such as a LAN, WLAN, or other networks. In Further, module 105 may be configured to receive data from a plurality of sources and communicate information to one or more external destinations. Accordingly, module 105 may include a receiver 120 and a transmitter 125. (It will be appreciated that, in some embodiments, the receiver and transmitter may be combined in a transceiver.) In some cases, communications between components may be made via the Internet, a cellular network, or other suitable communications network.

Any suitable communication platforms and/or protocols may be utilized for communication between module 105 and other components of the system. Since the various sources of information may each have their own platform and/or protocol, the system may be configured to interface with each platform and/or protocol to receive the data.

Module 105 may also include a graphical user interface (GUI) 130. GUI 130 may be accessible on any of a number of different displays. For example, GUI 130 may be viewable on a desktop computer monitor, a laptop, a tablet, a mobile phone, or other display devices.

Module 105 may be accessible by a variety of end users 135. Module 105 may be accessible by security object owners 140. For example, security object owners 140 may include any individuals to whom security objects are assigned. Security object owners 140 may thus have the responsibilities associated with any security objects for which they have been assigned ownership. An example of a security object and its owner is a user login to a network computer system and an employee to which the login is assigned. Another example of a security object and its owner is access to a database and a registered member of an organization such as a library.

In addition, module 105 may be accessible by administrators 145. Administrators 145 may have the rights and responsibilities to manage the technical operation of system 100. In some embodiments, administrators 145 may also have additional rights and responsibilities to create, assign, and reassign ownership of security objects. In other embodiments, the rights of administrators 145 may exclude one or more of these additional rights and responsibilities.

Also, module 105 may be accessible by information security (InfoSec) officers 150. Information security officers may include individuals in charge of creating, managing, and/or assigning ownership of security objects.

Further, in some embodiments, module 105 may be accessible by one or more third parties 155. For example, in some cases, individuals other than the security object owners and the employees/members of the organization hosting system 100 may be permitted access to certain aspects of system 100. In some embodiments, such third parties 155 may be granted access to aspects of system 100 in order to perform inspections regarding the management of security objects by the organization. In some cases, the third parties 155 may be a governing organization with regulatory authority over the organization hosting system 100.

In addition, in some embodiments, module 105 may be configured to receive data from at least one secondary system 160. Such a secondary system may include a database or other system operated by, or otherwise related to, the organization hosing system 100. In some embodiments, module 105 may be configured to take one or more actions pertaining to security objects based on data received from secondary system 160.

FIGS. 2-6 collectively illustrate a flowchart of the functions of system 100 pertaining to access by administrators, security object owners, and information security (InfoSec) officers.

Figure 2:
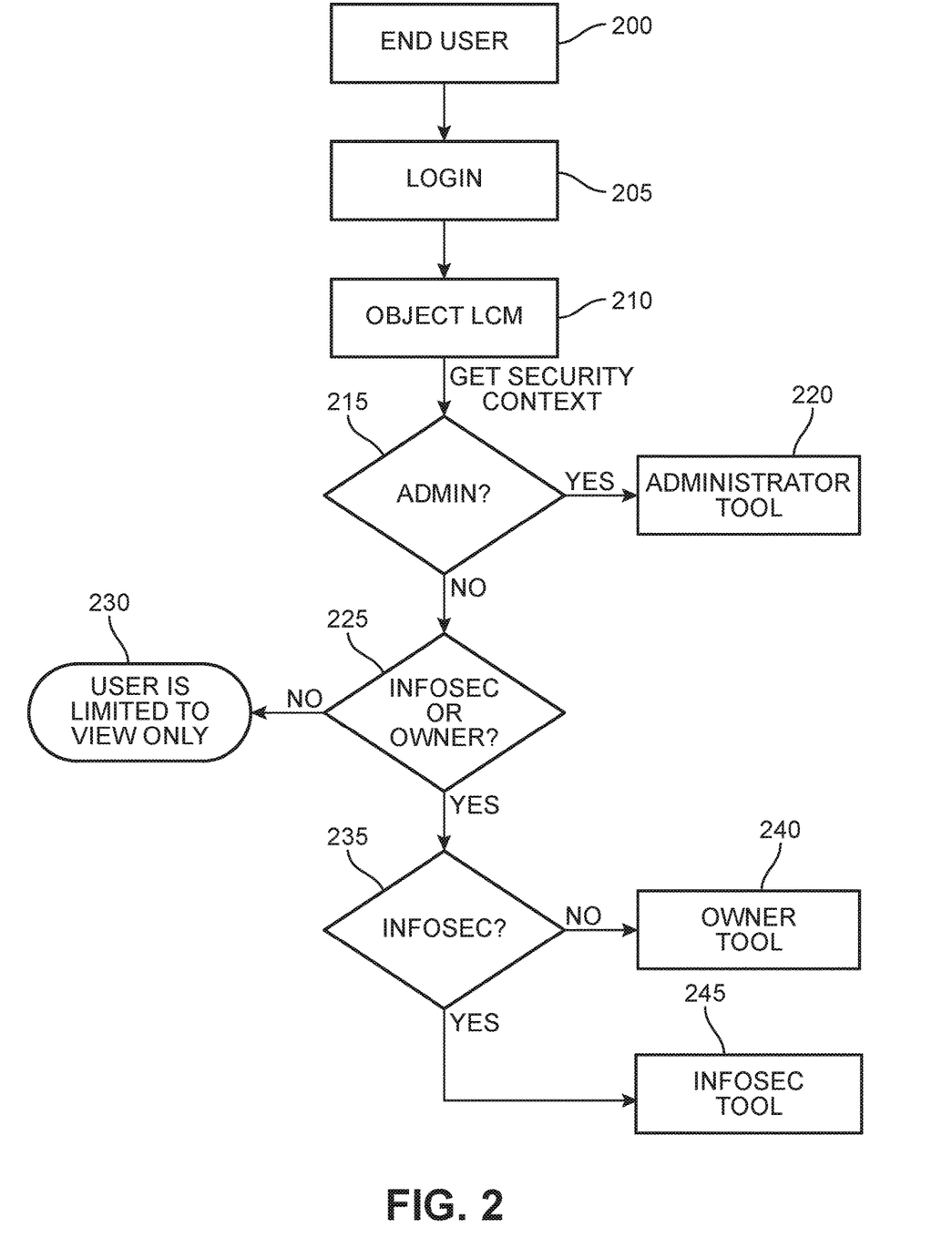
FIG. 2 is a flowchart illustrating steps of accessing a security object management system.
Figure 3:
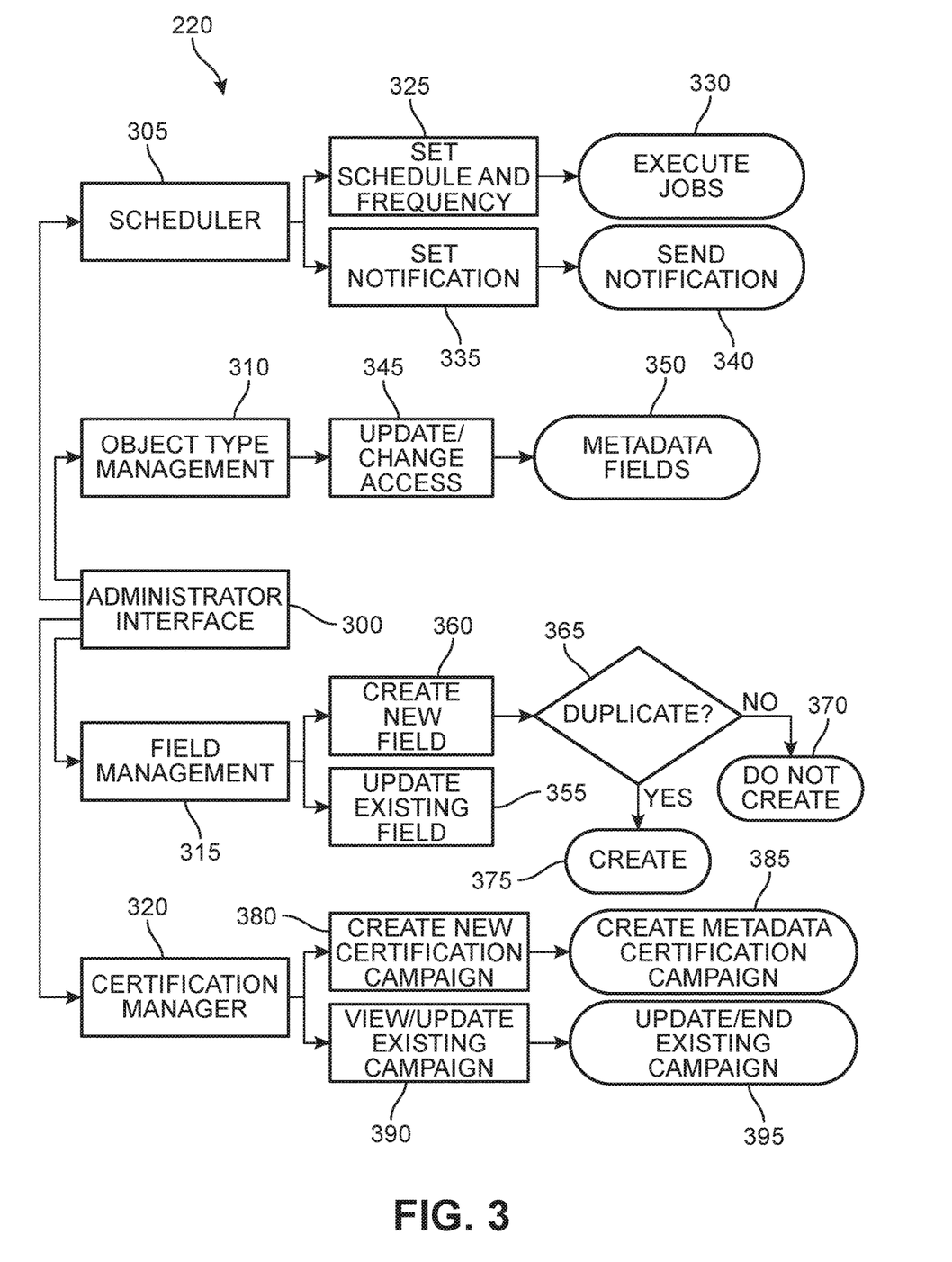
FIG. 3 is a flowchart illustrating functions accessible via the administrator tool of the security object management system.

FIG. 2 is a flowchart illustrating steps of accessing a security object life cycle management system. As shown in FIG. 2, an end user 200, via a login 205, may access a security object life cycle management system 210. Upon accessing system 210, a determination may be made at step 215 as to whether user 200 is an administrator. If yes, the system proceeds to access an administrator tool 220. Exemplary functions of administrator tool 220 are shown in FIG. 3 and discussed in detail below.

With further regard to FIG. 2, if user 200 is not an administrator, the next inquiry at step 225 is whether user 200 is an information security officer or a security object owner. If end user 200 is not an information security officer or a security object owner (e.g., a third party user), user 200 may be limited to view-only access, as indicated at step 230.

Figure 4:
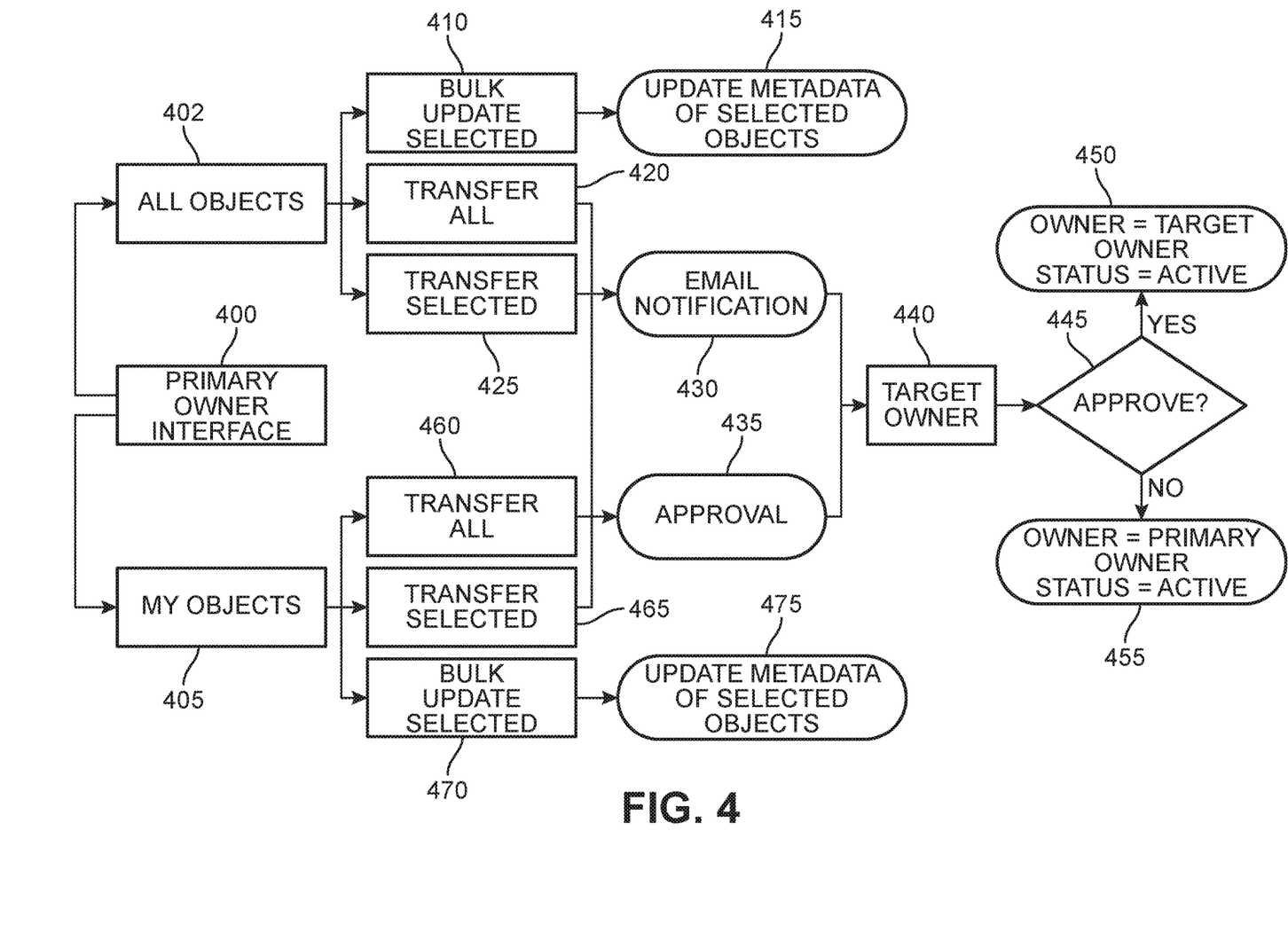
FIG. 4 is a flowchart illustrating a first group of functions accessible via the primary owner interface of the security object management system.
Figure 5:
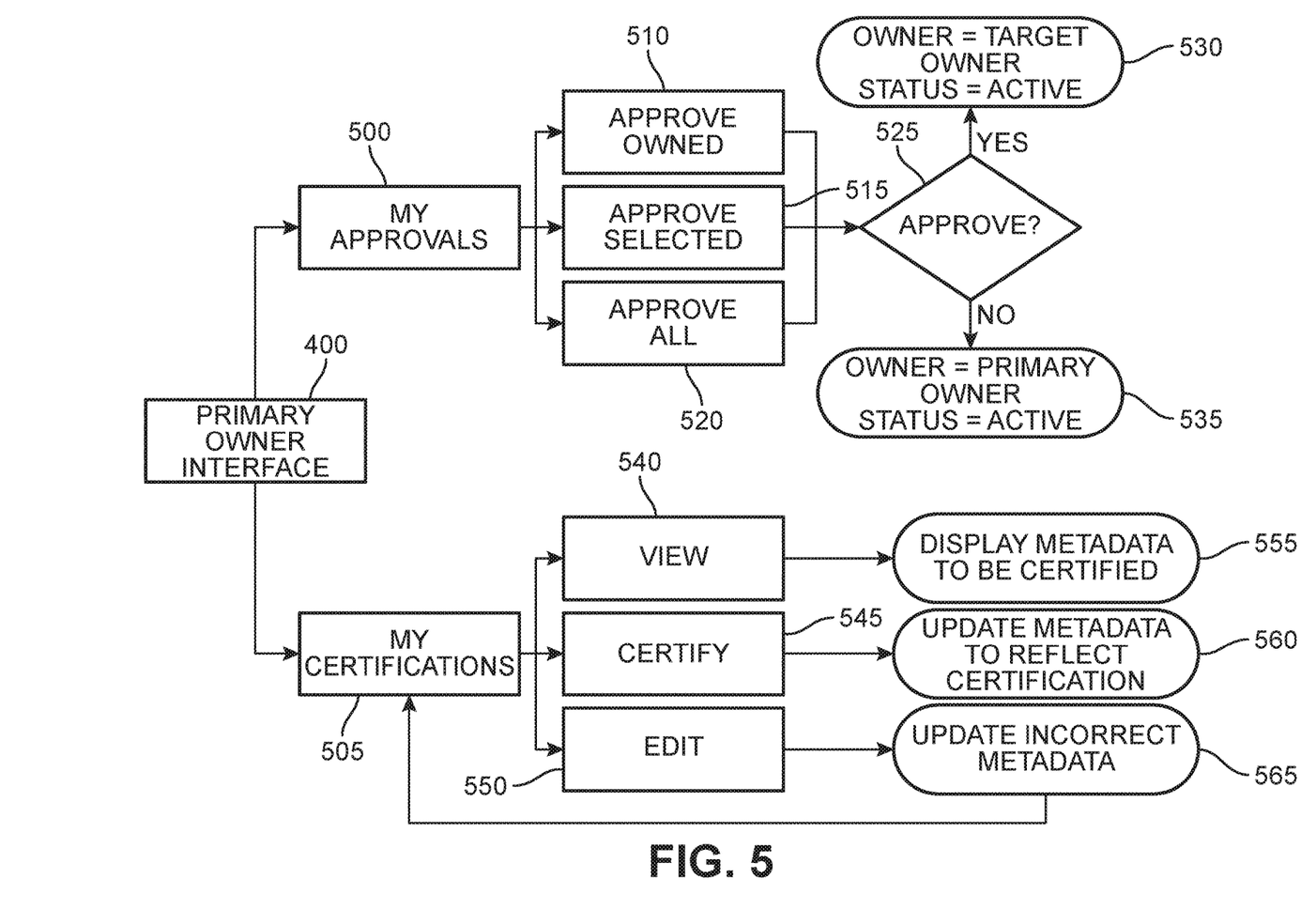
FIG. 5 is a flowchart illustrating a second group of functions accessible via the primary owner interface of the security object management system.

If, at step 225, end user 200 is determined to be an information security officer or a security object owner, the next inquiry, at step 235, is whether end user 200 is an information security officer. If not, the system proceeds to access a security object owner tool 240. Exemplary functions of owner tool 240 are shown in FIGS. 4 and 5 and discussed in detail below.

Figure 6:
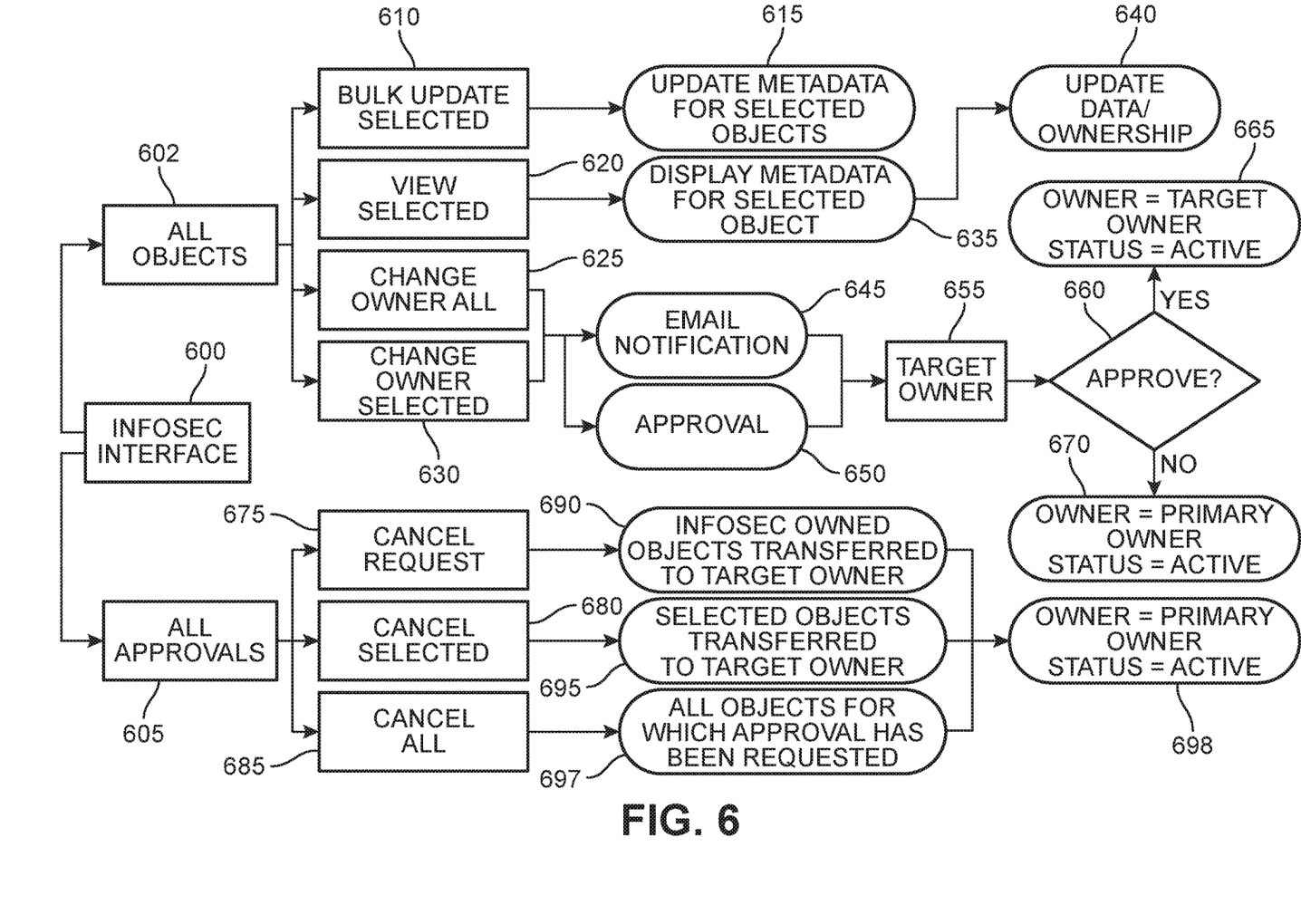
FIG. 6 is a flowchart illustrating functions accessible via the information security (InfoSec) interface of the security object management system.

With further regard to FIG. 2, if, at step 235, end user 200 is determined to be an information security officer, the system proceeds to access an information security officer (InfoSec) tool 245. Exemplary functions of InfoSec tool 245 are shown in FIG. 6 and discussed in detail below.

FIG. 3 is a flowchart illustrating functions accessible via the administrator tool of the security object management system. As shown in FIG. 3, the administrator tool has an administrator interface 300 with which an authorized administrator may interact with system 220. At administrator interface 300, the user may select from a plurality of functions or tools. For example, as shown in FIG. 3, system 220 may include a scheduler function 305, an object type management function 310, a field management function 315, and a certification manager function 320.

Upon selecting scheduler function 305, at least two additional options may be available. For example, as shown in FIG. 3, the administrator (user) may have the option, indicated at step 325, to set the schedule and frequency of certain operations associated with security objects. In response to commands selected at step 325, jobs may be executed at step 330. Additionally, or alternatively, within scheduler function 305, administrators may, via step 335, set notifications to users regarding security object operations scheduled by the administrator, which may result in at least one notification being sent at step 340.

Upon selecting object type management function 310, the administrator may update or change one or more aspects of security objects (step 345). For example, with object type management function 310, the administrator may update and/or change the access rights associated with a security object. Upon updating or changing the type of security object (i.e., changing the access rights associated with the object), new or updated data may be produced for existing metadata fields associated with the access permitted by security objects (step 350).

Upon selecting field management function 315, the administrator may update existing fields (step 355) or create new fields (step 360) associated with security objects. For example, the administrator may update an existing user ID and/or password at step 355 or create a new user ID and/or password at step 360. When creating a new field, the system may determine, at step 365, whether the new field to be created would be a duplicate. If yes, the system prevents the creation of the new field at step 370. If the new field to be created is not a duplicate of an existing field, the system proceeds with the creation of the new field at step 375.

Upon selecting certification manager function 320, the administrator may choose to create a new certification campaign at step 380, resulting in the creation of the new campaign at step 385. The certification campaign is a process by which the data/specs associated with a security object may be certified or verified by a system user. In some cases, the certification may be performed by a third party user, to verify that the security protocols of the organization hosting the system meet requirements.

In addition, using certification manager function 320, the administrator may view and/or update an existing certification campaign at step 390. Further, at step 395, the administrator may update or end an existing certification campaign.

FIGS. 4 and 5 illustrate the functions accessible via a primary owner interface 400 of owner tool 240. FIG. 4 is a flowchart illustrating a first group of functions accessible via primary owner interface 400 of the security object management system. As shown in FIG. 4, the owner (user) may access a complete listing of all objects at step 402. In some embodiments, the owner may access a listing of all objects assigned to them. For example, at step 405, the owner may select "My Objects" to see all objects for which they are assigned ownership.

Whether viewing "All Objects" or "My Objects," the owner may perform several different actions, including for example, a bulk update of selected objects, the transfer of all objects in the displayed list, or the transfer of selected objects from the list. For example, when viewing All Objects (402), the owner may select a Bulk Update (step 410), and effectuate the update of metadata of selected objects from the list (step 415). As part of the bulk update, all or less than all of the objects may be selected and updated simultaneously with a single input from the owner. Similarly, when viewing My Objects (405), the owner may select Bulk Update (step 470), and effectuate the update of metadata of selected objects from the list (step 475).

In addition, in some embodiments, the computer readable medium of the system may include instructions for receiving user input from an owner of a security object initiating a transfer of ownership of the security object from the present owner to a second system user. For example, as shown in FIG. 4, if Transfer All is selected at step 420, the owner may transfer all objects in the All Objects list, which may be all of the objects in the system (402), to a second system user. Similarly if Transfer All is selected at step 460, the owner may transfer all objects in the My Objects list to a second system user. Also, the owner may transfer selected objects from the All Objects list via step 425. Similarly, the owner may transfer selected objects from the My Objects list via step 465.

As shown in FIG. 4, for any of the transfers which may be initiated by the owner, a notification, such as an email notification 430, may be sent to a target owner 440 to whom ownership is to be transferred. In addition, the approval of the transfer by the owner is also conveyed to target owner 440 at step 435.

In some embodiments, the computer readable medium of the system may further include instructions for restricting authorization as to who may execute the transfer of ownership. In some cases, in order for the transfer to be completed, acceptance of the second system may be required in order for the initiated transfer to be completed if the user initiating the transfer is unauthorized to unilaterally execute the transfer. Accordingly, the system may execute an inquiry of target owner 440 at step 445 to determine whether the target owner approves/accepts the transfer initiated by the present owner of the security object. If target owner 440 approves the transfer, the transfer is executed and, in the metadata associated with the security object, the owner becomes target owner 440. If target owner 440 does not approve the transfer at step 445, then the owner remains the present owner at step 455.

In addition, in some embodiments, the system may further include instructions for sending a message to the user who initiated the transfer informing them whether the transfer has been accepted by the second system user. In some embodiments, the computer readable medium may include instructions for permitting the assignment of ownership of a security object to more than one system user. In some cases, the system may require assignment of each security object to at least one system user. That is, the ownership of certain security objects may not be unassigned. This ensures that at least one person remains responsible for such security objects at all times.

FIG. 5 is a flowchart illustrating a second group of functions accessible via the primary owner interface of the security object management system. As illustrated in FIG. 5 an object owner may access one of at least two listings of security objects. In particular, the owner may access My Approvals (500), which is a listing of ownership transfers that have been initiated by another user and await approval of the owner themself. That is, under My Approvals 500, the transferring user is the primary owner, and the owner accessing the data is the target owner. The user accessing the data may choose whether to approve all transfers for which the user is an owner but not currently the primary owner. In other words, the user may agree to accept primary ownership of objects for which they are already a secondary owner.

In order to execute this function, the user may utilize the Approve Owned function 510. Alternatively, the user may choose whether to approve a set of objects that they select themselves (step 515). As a further alternative, the user may choose whether to approve all objects awaiting transfer to them (step 520). Once the subset of transfers is chosen, the user may select whether to approve subset of transfers at step 525. If the user approves the transfers, the user, who is the target owner, becomes the primary owner of the selected objects (step 530). If the user does not approve the transfers and denies the assignment of ownership, the ownership of the objects for which transfer has been initiated remains with the primary (previous) owner (step 535).

In some embodiments, the computer readable medium of the system may include instructions for receiving user input to certify the accuracy of data associated with at least one of the security objects. Further, in some cases, the computer readable medium further includes instructions for certifying the data associated with multiple security objects in response to a single user input. Similarly, the computer readable medium may further include instructions for certifying the data associated with security objects for multiple users in response to a single user input.

In some embodiments, the computer readable medium includes instructions for certifying data associated with a security object in the database in response to input from an owner to which the security object is assigned. In some cases, the computer readable medium further includes instructions for certifying data associated with a security object in the database in response to input from a user with administrator rights. In addition, in some embodiments, the computer readable medium includes instructions for certifying data associated with a security object in the database in response to input from a third party having access rights exclusive of ownership and administrator rights of the security object in the database.

In some embodiments, the computer readable medium may include instructions for, in response to a change in data associated with a security object, executing a write back function whereby the change in the data is stored in a database that is accessible by the third party. As part of the write back function, the data may be stored in a field within the database that is certifiable by the third party. In some cases, the computer readable medium may further include instructions for, if the write back function is unsuccessful in storing the change in the data in the database that is accessible by the third party, performing a further attempt to execute the write back function after a predetermined amount of time, and for a predetermined number of attempts. Further, in some embodiments, the computer readable medium may include instructions for permitting access to the third party to see records regarding when ownership of security objects is transferred.

If the user accesses the My Certifications function 505, the user can view a listing of certifications for them to complete. Upon accessing the pending certifications listing, for one or more of the pending certifications, the user may view (step 540), certify (step 545), or edit (step 550) the objects awaiting certification. If the view function 540 is selected, the metadata to be certified may be displayed at step 555. If the user selects the certify function 545, the metadata associated with the object may be updated to reflect the certification (step 560). Similarly, if the edit function 550 is selected, the metadata may be updated to reflect the edits (step 565).

Information security officers may have the authorization and responsibility to manage the operation of the system. Accordingly, the computer readable medium of the system may include instructions for accessing a database having stored therein data regarding a plurality of security objects, wherein the data includes ownership data regarding the assignment of rights associated with the security objects. In addition, the computer readable medium may include instructions for receiving user input to change the reassignment of rights of at least one of the security objects from one user to another user of the system.

FIG. 6 is a flowchart illustrating functions accessible via the information security (InfoSec) interface of the security object management system. Via an InfoSec Interface 600, information security officers may access all objects (602) in the system. If All Objects 602 are retrieved, the information security officer may perform a bulk update function 610, resulting in the updating of metadata for selected objects at step 615. Via the bulk update function 610, the information security officer may change various aspects of security objects in a bulk fashion. For example, the officer may reset passwords for multiple security objects simultaneously with a single input once the set of objects to be updated are selected.

In addition, when accessing All Objects 602, one or more objects may be selected for viewing (step 620). The metadata for each selected object may be displayed (step 635). Further, if the information security officer so chooses, the data or ownership information for the selected objects may be updated (step 640).

In some embodiments, the ownership of security objects may also be changed by information security officers. As shown in FIG. 6, ownership of all objects (step 625) or selected objects (630) may be changed simultaneously. Accordingly, in some embodiments, the computer readable medium may include instructions for executing a bulk transfer of a plurality of security objects in response to a single user input. When the information security officer takes action to change ownership of security objects, an email notification 645 and the officer's approval 650 are conveyed to each target owner 655 to which ownership of the objects is being transferred.

In some embodiments, the approval of the target owners may be required for completion of the ownership transfer. Accordingly, at step 660, the target owner's approval may be received. If the target owner approves the transfer, the target owner becomes the owner of the object(s) being transferred (step 665). If the target owner does not approve and refuses the transfer, the primary (i.e., previous) owner remains the owner of the object(s) (step 670).

In addition, the computer readable medium may include instructions for receiving input from an information security officer to selectively approve ownership transfer requests initiated by other users. Accordingly, the information security officer may access All Approvals 605, which is a list of all ownership transfers awaiting approval by the information security officer. When accessing the pending approvals (605), the information security officer may cancel a transfer request (step 675), which transfers ownership of any InfoSec owned objects to a target owner (step 690). In addition, the officer may cancel a plurality of selected transfer requests (step 680), which transfers ownership of selected objects to a target owner (step 695). Further, the officer may cancel all transfer requests (step 685), which may retrieve all objects for which approval has been requested (step 697). For the InfoSec owned objects 690, selected objects 695, or all objects 697 the owner is set to the primary owners. That is, the ownership transfer is not completed.

In some embodiments, a security object management system may include a management module including a device processor and a non-transitory computer readable medium including instructions stored thereon, and executable by the processor. The computer readable medium may include instructions for accessing a database having stored therein data regarding a plurality of security objects. In addition, the computer readable medium may include instructions for receiving data from a different system and automatically inputting, into the database, data associated with at least one security object. For example, if an employee in a first department requests access to a database, the security object management system may receive data regarding this request and may input data into the database of security objects accordingly. Further, in some embodiments, when the data received from a different system includes a request for a new security object, the step of automatically inputting data into the database includes assigning ownership rights of the newly requested security object to the user requesting the new security object.

Figure 7:
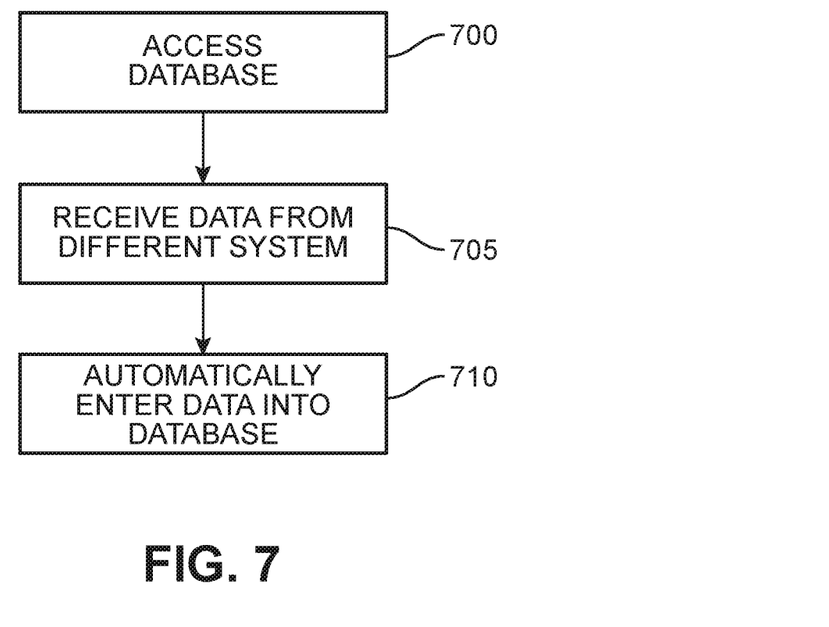
FIG. 7 is a flowchart illustrating method of automatically updating data in a database based on changes in data in a separate system.

FIG. 7 is a flowchart illustrating method of automatically updating data in a database based on changes in data in a separate system. As shown in FIG. 7, the system may access a database 700 of security objects. In addition, the system may receive data from a different system at step 705. Further, upon receiving the data, the security object management system may automatically enter data into the security object database at step 710.

In a more specific example, of the method shown and discussed with respect to FIG. 7, in some embodiments, security objects may be managed automatically in response to data received from other systems. For example, in some cases, the computer readable medium may include instructions for automatically reassigning rights associated with the at least one security object to a predetermined user. For example, in some embodiments, when an employee/member leaves an organization, any security objects assigned to them may be automatically reassigned to their supervisor.

Figure 8:
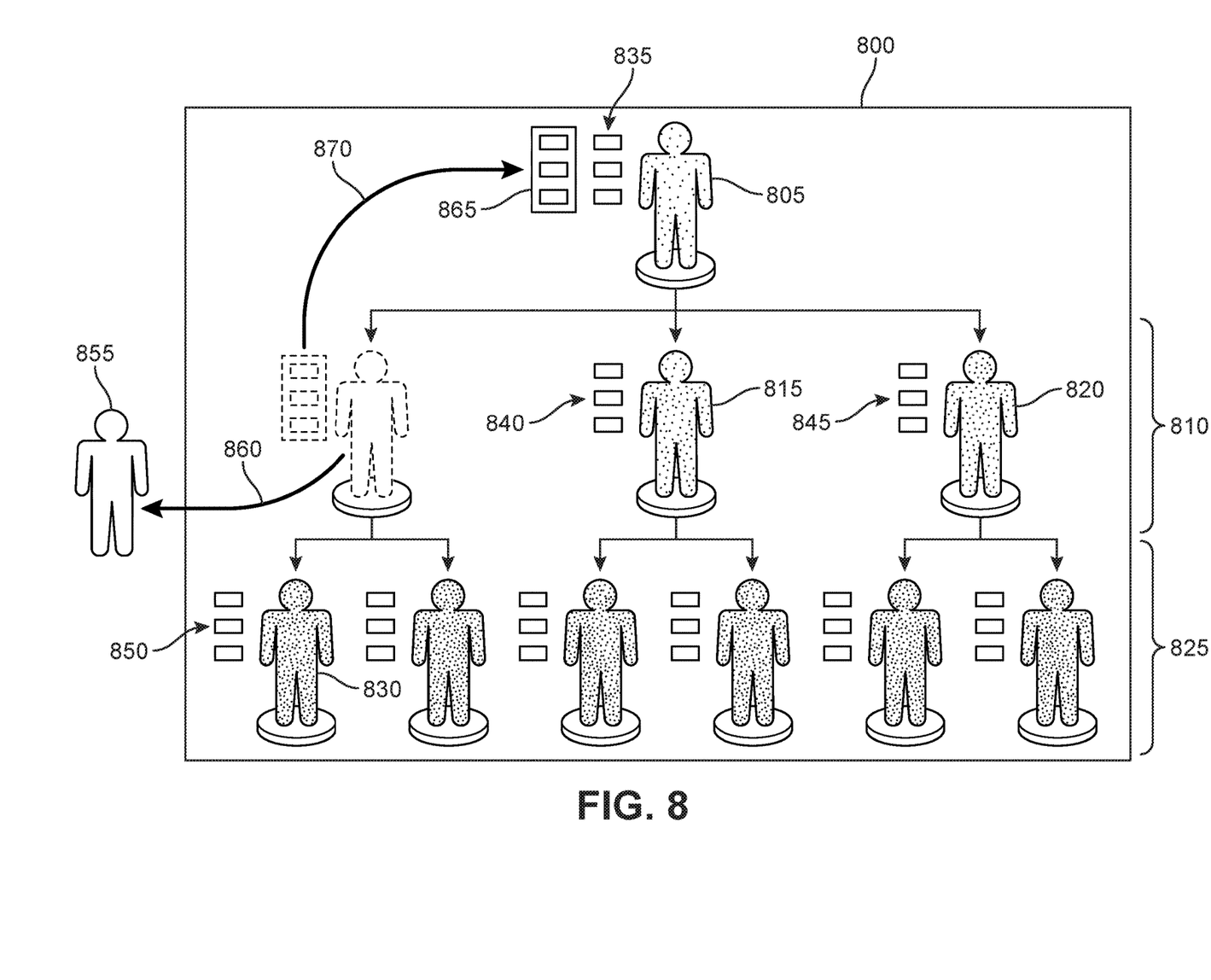
FIG. 8 is a schematic diagram illustrating a management hierarchy of an organization showing security objects of a former employee being transferred to the former employee's manager.

FIG. 8 is a schematic diagram illustrating a management hierarchy of an organization showing security objects of a former employee being transferred to the former employee's manager. As shown in FIG. 8, an organization 800 may include a plurality of employees for whom there is a management hierarchy. A manager 805 may have several employees reporting to them, including for example, a collection of individuals in a middle management group 810, such as a first division supervisor 815 and a second division supervisor 820. In addition, the organization may include a plurality of workforce employees 825 reporting to the middle management group 810, such as a workforce employee 830.

Each of the employees in organization 800 may have one or more security objects for which they are assigned ownership. For example, manager 805 may be owner of one or more security objects 835. Similarly, first division supervisor 815 may be owner of one or more security objects 840, and second division supervisor 820 may be owner of one or more security objects 845. Further, workforce employee 830 may be owner of one or more security objects 850.

In the event an employee leaves the organization, the security objects assigned to them may be automatically reassigned to a designated person, such as an information security officer, information technology professional, immediate supervisor, department supervisor, etc. As shown in FIG. 8, a middle management employee 855 is illustrated as having left the organization, as indicated by a first arrow 860. Upon leaving, the security objects 865 formerly owned by former middle management employee 855 may be automatically transferred to manager 805, as indicated by a second arrow 870.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A security object management system, comprising:
a management module including a device processor and a non-transitory computer readable medium including instructions stored thereon, and executable by the processor, for performing the following steps:
accessing a database having stored therein data regarding a plurality of security objects, wherein the data includes ownership data regarding the assignment of rights associated with the security objects; and receiving user input to change the reassignment of rights of at least one of the security objects from one user to another user of the system;

wherein the computer readable medium further includes instructions for executing a bulk transfer of a plurality of security objects in response to a single user input.

2. The system of claim 1, wherein the computer readable medium further includes instructions for receiving user input from an owner of a security object initiating a transfer of ownership of the security object from the present owner to a second system user.

3. The system of claim 2, wherein the computer readable medium further includes instructions for restricting authorization as to who may execute the transfer of ownership.

4. The system of claim 3, wherein the computer readable medium further includes instructions for requiring the second system user to accept the initiated transfer if the user initiating the transfer is unauthorized to unilaterally execute the transfer.

5. The system of claim 4, wherein the computer readable medium further includes instructions for sending a message to the user who initiated the transfer informing them whether the transfer has been accepted by the second system user.

6. The system of claim 2, wherein the computer readable medium further includes instructions for:

permitting the assignment of ownership of a security object to more than one system user; and requiring assignment of each security object to at least one system user.

7. A security object management system, comprising:

a management module including a device processor and a non-transitory computer readable medium including instructions stored thereon, and executable by the processor, for performing the following steps:

accessing a database having stored therein data regarding a plurality of security objects, wherein the data includes ownership data regarding the assignment of rights associated with the security objects; and receiving user input to certify the accuracy of data associated with at least one of the security objects;

wherein the computer readable medium further includes instructions for certifying data associated with a security object in the database in response to input from a third party having access rights exclusive of ownership and administrator rights of the security object in the database; and wherein the computer readable medium further includes instructions for, in response to a change in data associated with a security object, executing a write back function whereby the change in the data is stored in a database that is accessible by the third party.

8. The system of claim 7, wherein the computer readable medium further includes instructions for certifying the data associated with multiple security objects in response to a single user input.

9. The system of claim 8, wherein the computer readable medium further includes instructions for certifying the data associated with security objects for multiple users in response to a single user input.

10. The system of claim 7, wherein the computer readable medium further includes instructions for certifying data associated with a security object in the database in response to input from an owner to which the security object is assigned.

11. The system of claim 7, wherein the computer readable medium further includes instructions for certifying data associated with a security object in the database in response to input from a user with administrator rights.

12. The system of claim 7, wherein, as part of the write back function, the data is stored in a field within the database that is certifiable by the third party.

13. The system of claim 7, wherein the computer readable medium further includes instructions for, if the write back function is unsuccessful in storing the change in the data in the database that is accessible by the third party, performing a further attempt to execute the write back function after a predetermined amount of time, and for a predetermined number of attempts.

14. The system of claim 7, wherein the computer readable medium further includes instructions for permitting access to the third party to see records regarding when ownership of security objects is transferred.

15. A security object management system, comprising:

a management module including a device processor and a non-transitory computer readable medium including instructions stored thereon, and executable by the processor, for performing the following steps:

accessing a database having stored therein data regarding a plurality of security objects;

receiving data from a different system; and automatically inputting, into the database, data associated with at least one security object;

wherein automatically inputting data into the database includes automatically reassigning rights associated with the at least one security object to a predetermined user.

16. The system of claim 15, wherein, when the data received from a different system includes a request for a new security object, the step of automatically inputting data into the database includes assigning ownership rights of the newly requested security object to the user requesting the new security object.

* * * * *